United States Patent
Gundavelli et al.

(10) Patent No.: US 10,652,950 B2
(45) Date of Patent: May 12, 2020

(54) METHOD AND SYSTEM FOR PROVIDING SIGNED USER LOCATION INFORMATION

(71) Applicant: Cisco Technology, Inc., San Jose, CA (US)

(72) Inventors: Srinath Gundavelli, San Jose, CA (US); Pradeep Kumar Kathail, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 190 days.

(21) Appl. No.: 15/814,427

(22) Filed: Nov. 16, 2017

(65) Prior Publication Data

US 2019/0150223 A1    May 16, 2019

(51) Int. Cl.
  *H04W 84/04* (2009.01)
  *H04L 29/12* (2006.01)
  (Continued)

(52) U.S. Cl.
  CPC ....... *H04W 84/042* (2013.01); *H04L 61/6059* (2013.01); *H04W 4/02* (2013.01); *H04W 12/02* (2013.01); *H04W 12/06* (2013.01); *H04W 12/1004* (2019.01); *H04W 4/90* (2018.02); *H04W 12/08* (2013.01); *H04W 64/003* (2013.01); *H04W 76/12* (2018.02); *H04W 84/12* (2013.01); *H04W 92/02* (2013.01)

(58) Field of Classification Search
  CPC .............. H04W 84/042; H04W 76/022; H04L 61/6059
  USPC ........................................................ 713/152
  See application file for complete search history.

(56) References Cited

U.S. PATENT DOCUMENTS 8,041,335 B2 * 10/2011 Khetawat .............. H04L 63/104
  455/404.2
8,045,504 B2 * 10/2011 Bedekar .................. H04W 8/06
  370/328

(Continued)

FOREIGN PATENT DOCUMENTS

WO    2016/074748      5/2016
WO    2016/160058 A1  10/2016

OTHER PUBLICATIONS

International Search Report and Written Opinion in counterpart International Application No. PCT/US2018/059945, dated Jan. 22, 2019, 12 pages.

(Continued)

*Primary Examiner* — Lynn D Feild
*Assistant Examiner* — Viral S Lakhia

(57) ABSTRACT

In one embodiment, a system, apparatus, and method are described for requesting access authorization from an access network access point (AP) via an access network interface, generating at a processor a public-private key pair to be used to generate a cryptographically generated address (CGA) upon receiving the access authorization, sending a secure neighbor discovery (SeND)—neighbor solicitation (NS) to the AP via the access network interface after the public-private key pair has been generated, receiving a signed user location information (ULI) from the AP in response to the SeND-NS, and sending the signed ULI to one of a 3GPP mobility controller or an emergency service via a 3GPP network interface. Related systems, apparatuses, and methods are also described.

20 Claims, 4 Drawing Sheets

(51) Int. Cl.
  *H04W 12/06* (2009.01)
  *H04W 12/02* (2009.01)
  *H04W 12/10* (2009.01)
  *H04W 4/02* (2018.01)
  *H04W 84/12* (2009.01)
  *H04W 76/12* (2018.01)
  *H04W 4/90* (2018.01)
  *H04W 12/08* (2009.01)
  *H04W 64/00* (2009.01)
  *H04W 92/02* (2009.01)

(56) References Cited

U.S. PATENT DOCUMENTS

| | | | | |
|---|---|---|---|---|
| 8,533,455 | B2 * | 9/2013 | Haddad | H04L 9/0844 |
| | | | | 380/270 |
| 9,414,354 | B2 | 8/2016 | Dhammawat et al. | |
| 2005/0041634 | A1 * | 2/2005 | Aura | H04L 41/12 |
| | | | | 370/351 |
| 2005/0240943 | A1 * | 10/2005 | Smith | G06F 9/465 |
| | | | | 719/328 |
| 2010/0313024 | A1 * | 12/2010 | Weniger | H04L 63/0823 |
| | | | | 713/170 |
| 2011/0004766 | A1 * | 1/2011 | Camarillo | H04L 29/12801 |
| | | | | 713/176 |
| 2012/0084568 | A1 * | 4/2012 | Sarikaya | H04L 9/3066 |
| | | | | 713/176 |
| 2015/0127823 | A1 * | 5/2015 | Moeller | H04L 43/16 |
| | | | | 709/224 |
| 2015/0288581 | A1 * | 10/2015 | Yang | H04L 12/14 |
| | | | | 709/224 |
| 2016/0249193 | A1 | 8/2016 | Edge et al. | |
| 2017/0086162 | A1 * | 3/2017 | Österlund | H04L 61/2015 |
| 2017/0094457 | A1 * | 3/2017 | Lee | H04W 4/10 |
| 2017/0134947 | A1 * | 5/2017 | Nilsson | H04W 12/06 |
| 2019/0081958 | A1 * | 3/2019 | Lee | H04L 63/145 |

OTHER PUBLICATIONS

Cisco Systems, Inc.; "Network Provided User Location Information Reporting Extensions Over S2b Interface", ePDG Administration Guide, StarOS Release 21.2; 2017.

* cited by examiner

METHOD AND SYSTEM FOR PROVIDING SIGNED USER LOCATION INFORMATION

TECHNICAL FIELD

The present disclosure generally relates to access authorization and user-location binding in IEEE 802.11 networks.

BACKGROUND

Mobile Operators are expanding their network coverage by integrating various access-technology domains into a networked mobility core. A user equipment (UE, referring to a device used by an end-user to communicate) can access the 3rd Generation Partnership Project (3GPP) $5^{th}$ generation (5G) mobile network and operator services through an access network based on wireless local area networking (i.e. Wi-Fi), or other radio access technology (RAT) types. There are standardized interfaces which provide a user plane with related control and mobility support, for instance, 3GPP S2a (specified in TS 29.275 and TS23.402) and S2b (specified in TS 29.274 and TS29.275) that define this interworking, and the same interfaces are inherited by the 3GPP 5G architecture. Specifically, the interfaces in 5G may have different names than their corresponding interfaces in 4G. However, the approach of accessing 3GPP services through a non-3GPP network such as IEEE 802.11 based Wireless LAN networks remains in 5G.

When the access network through which the UE attaches is a trusted access network (based on 3GPP S2a interface) there is interworking between the access and the home network, with mechanisms for exchanging user-location information (ULI) without UE involvement. However, for untrusted access network, there are no interfaces between the home network and the access network.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

In one embodiment, a system, apparatus, and method are described for requesting access authorization from an access network access point (AP) in an IEEE 80211 based Wireless LAN network, generating at a processor a public-private key pair to be used to generate a cryptographically generated address (CGA) upon receiving the access authorization, sending a secure neighbor discovery (SeND) (see RFC 3971)—neighbor solicitation (NS) to the AP via the access network interface after the public-private key pair has been generated, receiving a signed user location information (ULI) from the AP in response to the SeND-NS, and sending the signed ULI to one of a 3GPP mobility controller or an emergency service via a 3GPP network interface. Related systems, apparatuses, and methods are also described.

Example Embodiment

Figure 1:
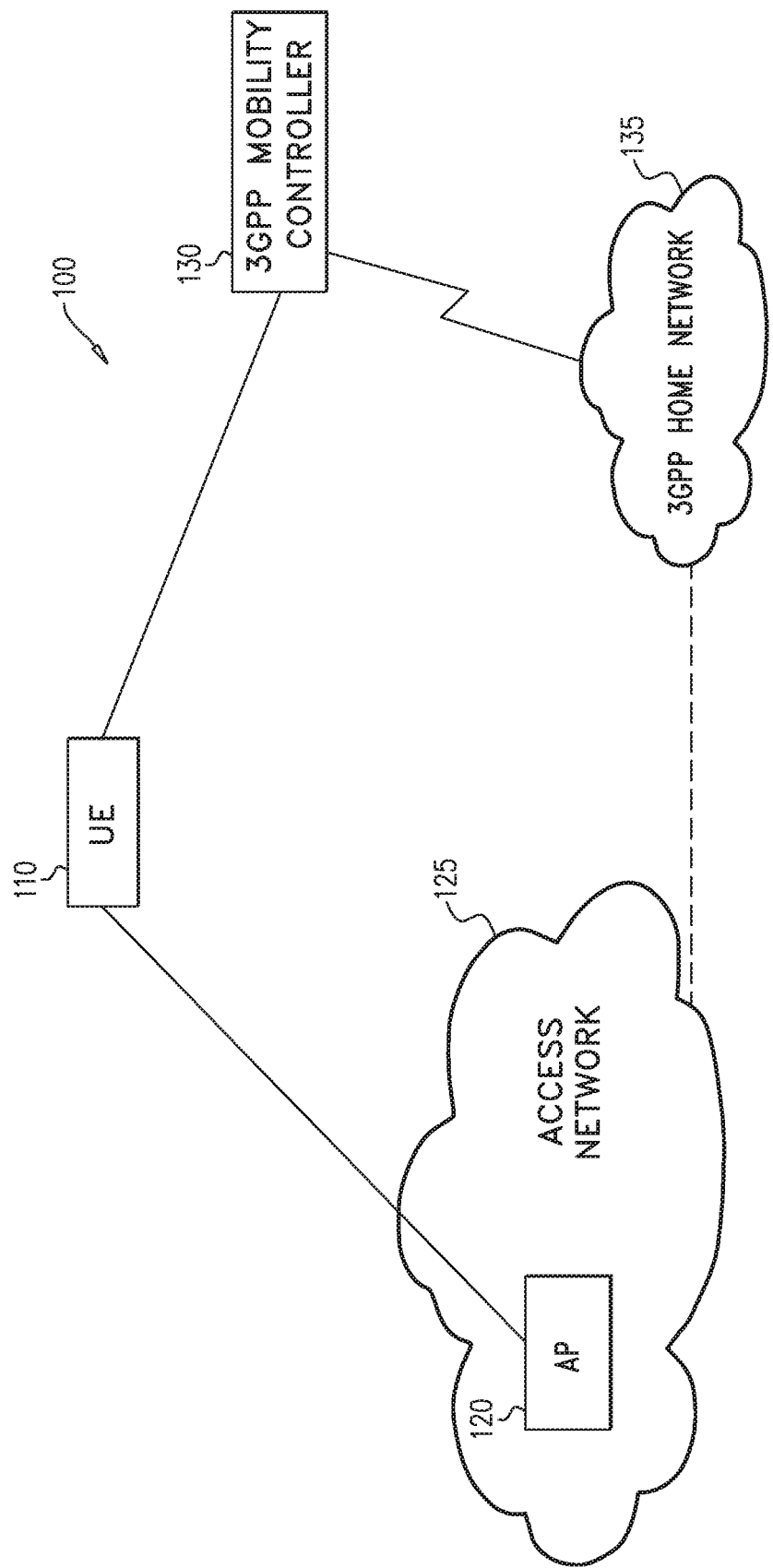
FIG. 1 is a simplified pictorial illustration of a system architecture constructed and operative in accordance with an embodiment of the present disclosure.

Reference is now made to FIG. 1, which is a simplified pictorial illustration of a system architecture constructed and operative in accordance with an embodiment of the present disclosure. The system 100 includes a 3rd Generation Partnership Project (3GPP) user equipment (UE) 110 which is in communication with a network access point (AP) 120 (e.g., a Wireless Local Area Network (LAN) controller). The 3GPP UE 110 may be a $4^{th}$ generation (4G) 3GPP UE or a $5^{th}$ generation (5G) 3GPP UE.

The AP 120 is typically a wireless IEEE 802.11 LAN, although, as is known in the art, other any appropriate network which with which the AP 120 is able to communicate may be accessed via the AP 120. The AP 120 is used by the UE 110 to access an Wi-Fi access network 125, as will be explained below. The UE 110 is also in communication with a 3GPP mobility controller 130. The 3GPP mobility controller 130 is a term used herein to refer to services provided by a provider or operator with which a user of the UE 110 has a business relationship. Typically the provider may be a cellular telephone company. The 3GPP mobility controller 130 enables access to the provider's network, hereinafter referred to as a 3GPP home network 135.

3GPP systems typically rely on Internet Protocol (IP) as a key protocol for transport services. Accordingly, the system 100 relies on interfaces as defined in various 3GPP technical specifications as are known in the art. It is appreciated that various interfaces may have different names in the 4G and 5G specifications. Nevertheless, corresponding 4G and 5G interfaces may be referred to herein by one of those names, without intending to exclude the other. When accessing a network via a trusted non-3GPP Wi-Fi access network 125, there is interworking (indicated by a dotted line) between the Wi-Fi access network 125 and the 3GPP home network 135. This interworking between the Wi-Fi access network 125 and the 3GPP home network 135 provides mechanisms for exchanging user-location information (ULI) without UE 110 involvement.

By contrast, when accessing a network via an untrusted network, there typically are no interfaces between the Wi-Fi access network 125 and the 3GPP home network 135 (i.e., in such a configuration, it is as though the dotted line is not in FIG. 1). Accordingly, in such a configuration of the system 100, the UE 110 typically is the only trusted source to provide ULI. However, regulatory requirements for certain emergency services require a network reported ULI, as opposed to a UE reported ULI. For example, in case of an emergency telephone call user location information of the respective user may be required for forwarding the location information to the emergency authorities. In light of bring your own device (BYOD) model adoption as well as other security vulnerabilities, there may be an assumption that the provider cannot trust a UE stack, as will be appreciated by those of skill in the art.

Trusted non-3GPP access networks and untrusted non-3GPP access networks are IP access networks that use access technology which the 3GPP network relates to as if they are a black-box (i.e., a system which can be viewed in terms of its inputs and outputs, without any knowledge of its internal workings or implementation). Whether a Non-3GPP IP access network is trusted or untrusted is not a characteristic of the access network itself, but rather depends on a trust relationship (or lack of a trust relationship) between the Wi-Fi network operator and the 3GPP network operator.

Typically, a 4G UE, such as UE 110, connects to an evolved Packet Data Gateway (ePDG) in an untrusted wireless LAN network via a 3GPP SWu interface, and the ePDG connects over a 3GPP S2b interface to a Packet data network Gateway (PGW). A 5G UE, such as UE 110, typically connects to an untrusted wireless LAN network over a 3GPP NWu interface, connecting to a N3IWF (Non-3GPP InterWorking Function). The N3IWF connects via over a 3GPP N3 network interface to a user plane function, as well as via a control plane function, also to the user plane function.

Figure 2:
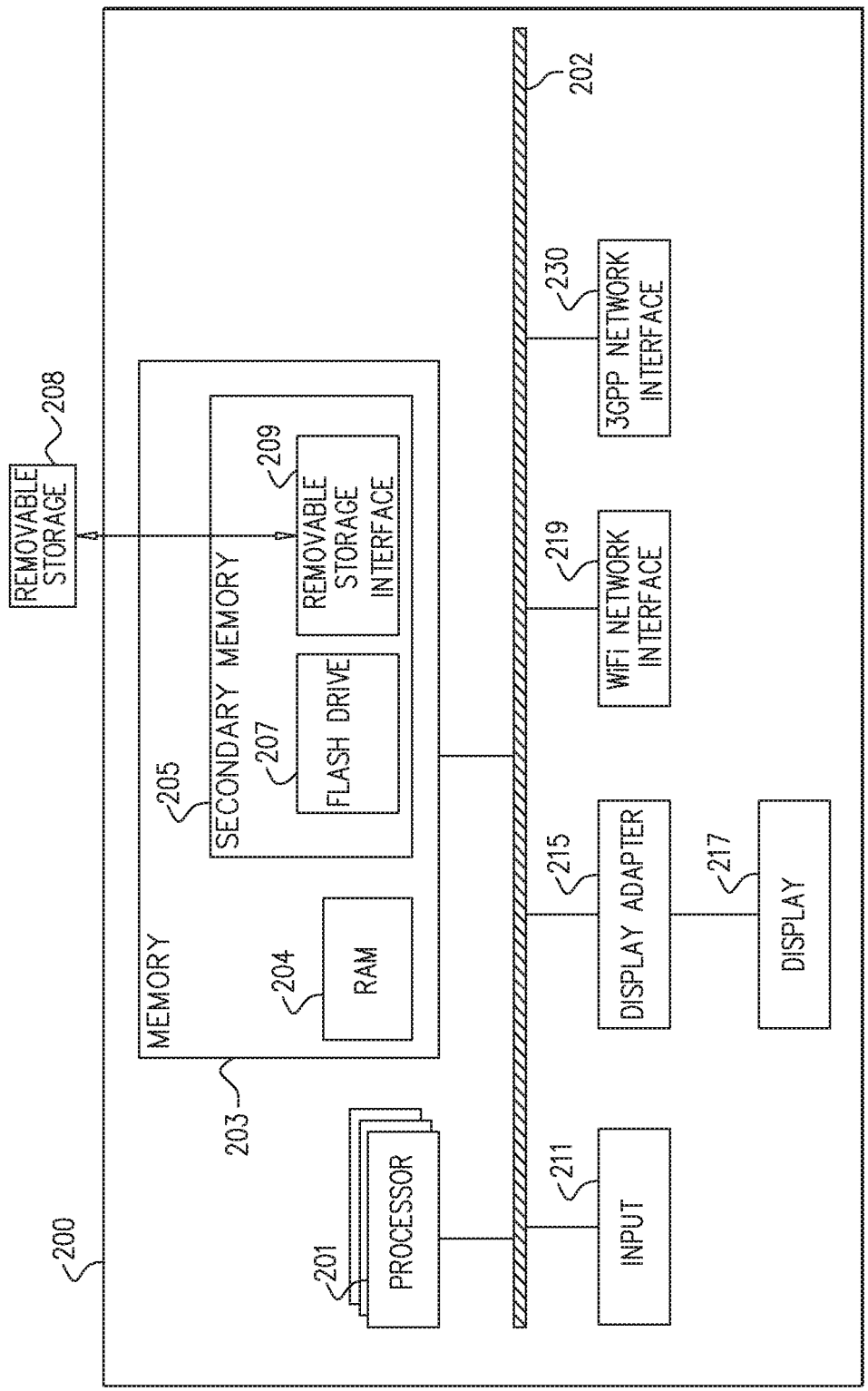
FIG. 2 is a simplified pictorial illustration of an exemplary 3GPP user equipment for use in the system of FIG. 1.

Reference is now made to FIG. 2, which is a simplified pictorial illustration of an exemplary 3GPP user equipment, such as UE 110, for use in the system of FIG. 1.

The exemplary UE 200 is suitable for implementing the systems, methods described herein. The exemplary UE 200 comprises one or more processors, such as processor(s) 201, provide an execution platform for executing machine readable instructions such as software. The one or more processors 201 may be a special purpose processor operative to perform the method for providing an access network signed ULI for 3GPP emergency services as described herein. Cryptographic functions, such as those described herein below, may be executed by the one or more processors 201, one of which may itself be a dedicated cryptographic processor, or may comprise logic circuits for cryptographic functions. The one or more processors 201 comprise dedicated hardware logic circuits, in the form of an application-specific integrated circuit (ASIC), field programmable gate array (FPGA), or full-custom integrated circuit, or a combination of such devices. Alternatively, or additionally, some or all of the functions of the one or more processors 201 may be carried out by a programmable processor or digital signal processor (DSP), under the control of suitable software. This software may be downloaded to the processor in electronic form, over a network, for example. Alternatively, or additionally, the software may be stored on tangible storage media, such as optical, magnetic, or electronic memory media.

Commands and data from the one or more processors 201 are communicated to their destination over a communication bus 202. The exemplary UE 200 also includes a main memory 203, such as one of a or Random Access Memory (RAM) 204, where machine readable instructions may reside during runtime, and a secondary memory 205. The secondary memory 205 comprises, for example, a flash memory drive 207 and/or a removable storage card 208, such as a removable flash drive, a secure digital (SD) memory card, a micro-SD memory card, and so forth, where a copy of the machine-readable instructions or software may be stored. The secondary memory 205 may also comprise ROM (read only memory), EPROM (erasable, programmable ROM), EEPROM (electrically erasable, programmable ROM). In addition to software, data may be stored in the main memory 203 and/or the secondary memory 205. The removable storage 208 reads from and/or writes to a removable storage interface 209 in a well-known manner.

A user can interface with the exemplary UE 200 via a user interface which comprises one or more input devices 211, (such as a touch screen, a stylus, and the like) in order to provide user input data. A display adapter 215 interfaces with the communication bus 202 and a display 217, receives display data from the one or more processors 201, and converts the display data into display commands for the display 217.

A Wi-Fi (i.e., a IEEE 802.11) network interface 219 is provided for communicating with other systems and devices (external to the exemplary client device 200) via the AP 120 of FIG. 1, e.g., via the Wi-Fi access network 125 of FIG. 1. The Wi-Fi network interface 219 typically includes a wireless interface for communicating with wireless devices in a wireless network. The exemplary UE 200 may optionally comprise other interfaces (not depicted), including, but not limited to Bluetooth, and HDMI.

The exemplary UE 200 also is depicted as having a 3GPP network interface 230. The 3GPP network interface 230 comprises a wireless interface for communicating with the 3GPP mobility controller 130. As noted above, IP is a key protocol for transport services, and as such, the Wi-Fi network interface 219 and the 3GPP network interface 230 may share at least some hardware and software. Nevertheless, as a convenience for the present specification and claims, these two interfaces (Wi-Fi network interface 219 and the 3GPP network interface 230) are described as being separate elements of the exemplary UE 200.

It will be apparent to persons skilled in the art that one or more of the components of the exemplary UE 200 may not be included in the exemplary UE 200 and/or other components may be added to the exemplary UE 200, as is known in the art. The exemplary UE 200 shown in FIG. 2 is provided as an example of a possible platform that may in the system 100 of FIG. 1, as will be explained below, and other types of UE 110 platforms may be used as well, as is known in the art.

Figure 3:
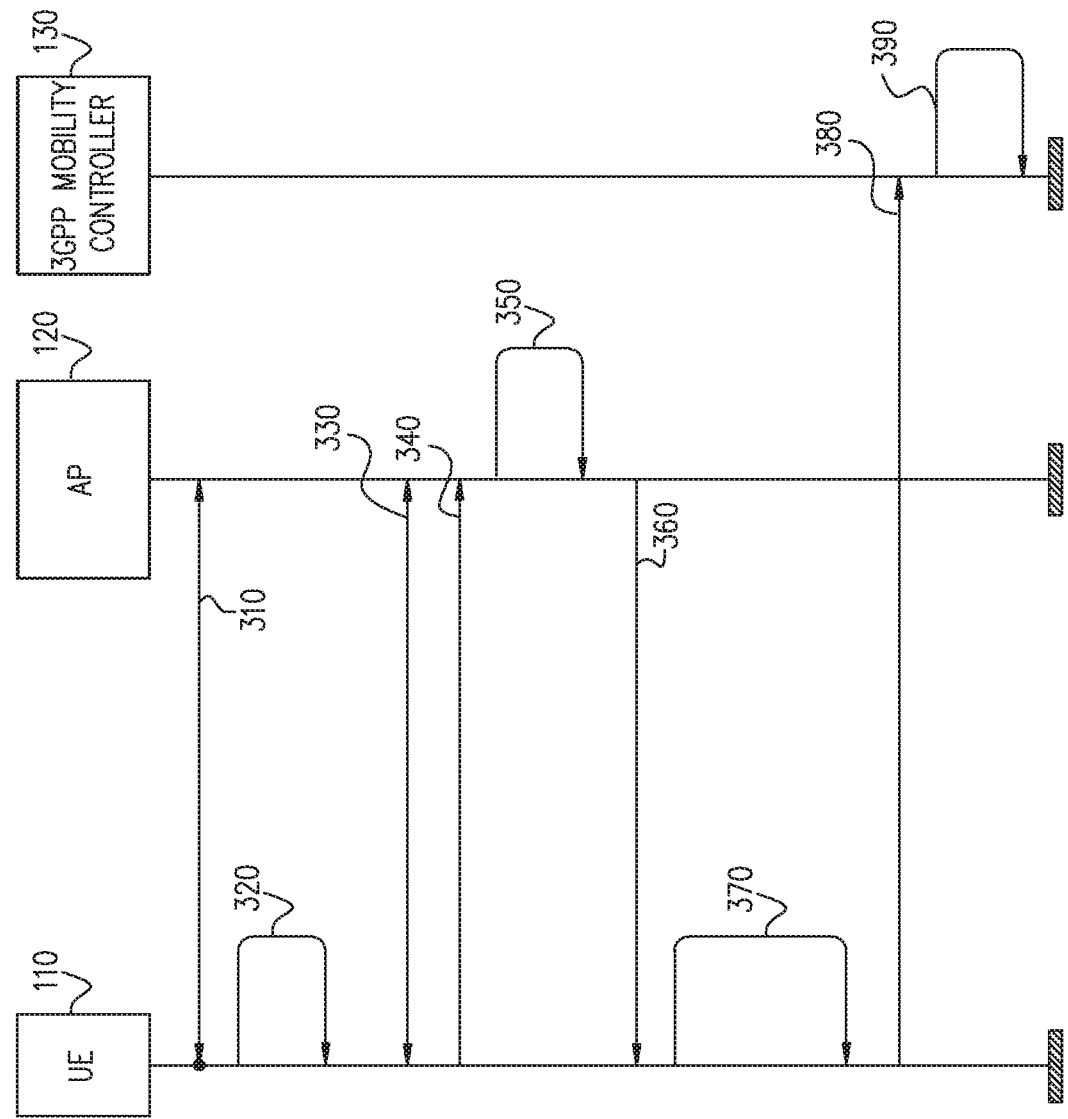
FIG. 3 is a data flow diagram detailing data flow in accordance an embodiment of the present disclosure in the system of FIG. 1.

Reference is now made to FIG. 3, which is a data flow diagram detailing data flow in accordance an embodiment of the present disclosure in the system of FIG. 1. Reference numerals used in the description of the above Figures are used herein below to refer to the same elements. By way of introduction to the discussion of FIG. 3, signed-ULI is obtained from the Wi-Fi access network 125 to which the UE 110 is attached. The UE reports the signed-ULI to an emergency service, and/or to the 3GPP home network 135. The signed-ULI will utilize IPv6 secure neighbor discovery (SeND), a protocol defined in RFC 6494. The UE's 110 IPv6 address will be cryptographically bound, as described below, with timestamp information and access-network-location identifiers. The signed ULI will be generated by the Wi-Fi access network 125 (via the AP 120, which may comprise a wireless LAN controller, first-hop router, and so forth, as is known in the art) and will be delivered to the UE 110 using IPv6 neighbor discovery (ND/SeND) extensions (IPv6 ND, specified in RFC 4861, is a Neighbor Discovery protocol for IP Version 6).

SeND with IPv6 cryptographically generated address (CGA) brings a layer of security ensuring the owner of signed ULI is indeed the owner of the IPv6 address which is cryptographically generated. As is known in the art, CGA is an IPv6 address having a host identifier computed from a cryptographic hash function. Alternatively, the signed-ULI can also be delivered over secure link-layer protocols such as IEEE 802.11u and with logic for binding the IPv6 address to the signed ULI.

The UE 110 can report the signed-ULI to a packet data gateway over an appropriate 3GPP interface for IPSec tunnels (e.g., the SWu interface in 4G networks, or the N3IWF interface in 5G networks), and then the signed-ULI is then forwarded to the PGW in 4G networks, or to the user plane function in 5G networks, or alternatively the signed-ULI may be transmitted over an application layer.

Location reporting, as described herein, is, therefore, based on indirect trust. Accordingly, no business relation is needed between the 3GPP home network 135 operator and the Wi-Fi access network 125 operator. By way of example, a UE (e.g. UE 110) of a mobile network operator's subscriber (i.e., where the mobile network operator is the 3GPP home network 135 operator) may attach to a public hotspot's Wi-Fi network (i.e., operated by a Wi-Fi access network 125 operator), regardless of whether or not there exists a relationship between the 3GPP home network 135 operator and the Wi-Fi access network 125 operator. The UE of the mobile telephone provider's subscriber in question obtains the signed-ULI object from the Wi-Fi access network 125 while attaching to the Wi-Fi access network 125 and can then report the signed-ULI object to the 3GPP home network 135.

The signed-ULI asserts that a node using an IPv6 address, for example, CAFE::1/128 was at the public hotspot's location (i.e., network identification information, such as a service set identifier (SSID) of the network, the network's geo-location, and so forth) at a time "T". The Wi-Fi access network 125 delivers the signed-ULI only to the IPv6 node over IPv6 Neighbor Discovery and this has no privacy implications. The 3GPP home network 135 or the emergency service may choose to trust the signed-ULI, for example, if the signing entity is a known public entity. Otherwise, 3GPP home network 135 or the emergency service may choose to not trust the signed-ULI. The involvement of a third-party and having the third-party's signature on the signed ULI presumably make the ULI more trustworthy.

Turning now specifically to the data flow diagram of FIG. 3, three actors are depicted in FIG. 3. The UE 110, the AP 120, and the 3GPP mobility controller 130. Communication between the UE 110 and the AP 120 occur via the Wi-Fi network interface 219 of FIG. 2. Communication between the UE 110 and the 3GPP mobility controller 130 occur over the 3GPP network interface 230 of FIG. 2.

At stage 310, the UE 110 and the AP 120 establish a network connection including at least authentication of the UE 110 by the AP 120, and may include mutual authentication of both the UE 110 by the AP 120 and of the AP 120 by the UE 110. The nature of authentication may range from a 'lenient' Open Authentication scheme to a more 'stringent' authentication involving mutual authentication utilizing cryptographic methods, such as WPA (Wi-Fi Protected Access) key management. The nature and type of authentication executed at stage 310 is dependent on the type and location of the AP 120, the requirements and polices of an operator of the AP 120, and so forth, as is known in the art.

At stage 320 the UE 110 generates a public and private key for use in the IPv6 CGA. The CGA is generated and then, at stage 330 IPv6 SeND is used for any neighbor discovery messages (for example, between UE 110 and AP 120) which entail a link-layer protocol, i.e., neighbor discovery, e.g., neighbor solicitation messages (ND-NS) and/or neighbor discovery—neighbor advertisement messages (ND-NA). At stage 340, the UE 110 sends the AP 120 a SeND-NS message. The SeND-NS message includes in its fields the CGA, a nonce, a request for a ULI, and a public key, such as an RSA public key. The nonce, as is known in the art, is typically concatenated with the signature as a method to foil replay attacks.

At stage 350, the AP 120 utilizes the public key in order to generate a signed ULI, which binds the CGA with timestamp information and access-network-location identifiers. The AP 120, at stage 360 replies to the UE 110 with a second SeND-NA message. The second SeND-network advertisement (NA) message includes the CGA, the nonce, and the signed ULI.

At stage 370, the UE 110 now is able to store the signed ULI which it has received from the AP 120 via the Wi-Fi access network 125.

As explained above, at stage 380, the UE 110 reports the signed-ULI to the 3GPP mobility controller 130. Alternatively, the signed ULI may be reported over an application layer. At stage 390, the 3GPP mobility controller 130 updates its records concerning the location of the UE 110 with the content of the signed ULI, after validating the signing entity.

Figure 4:
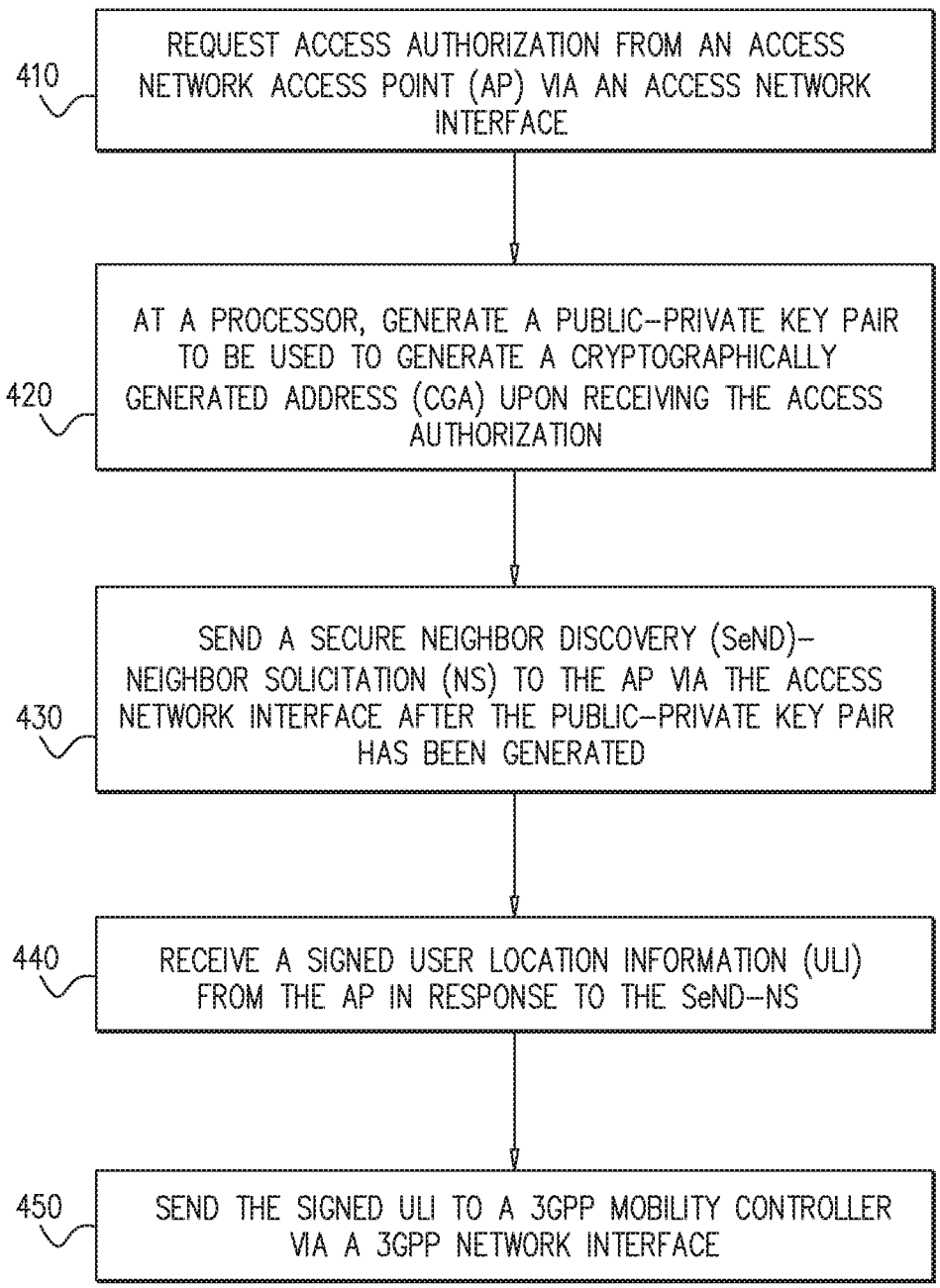
FIG. 4 is a flow chart showing exemplary steps in one method of operation of the system of FIG. 1.

Reference is made to FIG. 4, which is a flow chart showing exemplary steps in one method of operation of the system of FIG. 1. At step 410, access authorization is requested from an access network access point (AP) via an access network interface. By way of example, the UE 110 of FIG. 1 requests access authorization from the Wi-Fi access network 125 of FIG. 1 via communication between the Wi-Fi network interface 219 (FIG. 2) and the access point 120 of FIG. 1. A public-private key pair is generated at a processor 210 (FIG. 2). The public-private key pair is used to generate a cryptographically generated address (CGA) upon receiving the access authorization (step 420).

At step 430, a secure neighbor discovery (SeND) neighbor solicitation (NS) is sent to the AP via the access network interface after the public-private key pair has been generated. A signed user location information (ULI) is received from the AP in response to the SeND-NS (step 440). At step 450 the signed ULI is sent to a one of a 3GPP mobility controller or an emergency service via a 3GPP network interface.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. An apparatus comprising:
   an access network interface, including a wireless interface in communication with a hardware processor, the processor operative to:
   request access authorization from an access network access point (AP);
   send a secure neighbor discovery (SeND)—neighbor solicitation (NS) to the AP after a public-private key pair has been generated in response to receiving access authorization from the AP; and receive a signed user location information (ULI) from the AP in response to the SeND-NS, wherein the signed ULI includes a timestamp indicative that the apparatus was at a location of the AP at a given time:

the processor operative to generate the public-private key pair to be used to generate a cryptographically generated address (CGA) upon receiving the access authorization; and a 3GPP network interface, including a wireless interface, operative to send the signed ULI to one of a 3GPP mobility controller or an emergency service.

2. The apparatus according to claim 1 wherein the SeND-NS comprises the CGA, a nonce, a ULI request, and the public key of the public-private key pair.

3. The apparatus according to claim 1 wherein the ULI is signed with the cryptographic-public key.

4. The apparatus according to claim 1 wherein the signed ULI is received from the AP via a link layer protocol.

5. The apparatus according to claim 1 wherein the signed ULI is received from the AP via IPv6 SeND-NA.

6. The apparatus according to either claim 4 or claim 5 wherein the signed ULI is received with the CGA and the nonce.

7. The apparatus according to claim 1 wherein the signed ULI comprises at least one of: the CGA, a timestamp, geo-location information, a service set identifier (SSID) of the access network; a signed object with the private key in the ULI; and a public key of the access network.

8. The apparatus according to claim 1 wherein the 3GPP network interface sends the signed ULI to the 3GPP mobility controller over a first interface to a packet data gateway, and over a second interface to a PGW (packet data network gateway) from the packet data gateway.

9. The apparatus according to claim 1 wherein the 3GPP network interface sends the signed ULI to the 3GPP mobility controller over an application layer protocol.

10. The apparatus according to claim 1 wherein the AP comprises a wireless LAN controller or a first hop router.

11. The apparatus according to claim 1 wherein the location of the apparatus is updated in records of the 3GPP mobility controller with the contents of the signed ULI.

12. The apparatus according to claim 1 wherein the apparatus sends the signed ULI over an application layer protocol to the emergency service.

13. A method comprising:
requesting access authorization from an access network access point (AP) via an access network interface;
generating at a processor a public-private key pair to be used to generate a cryptographically generated address (CGA), the CGA being generated upon receiving the access authorization;
sending a secure neighbor discovery (SeND)—neighbor solicitation (NS) to the AP via the access network interface after the public-private key pair has been generated;
receiving a signed user location information (ULI) from the AP in response to the SeND-NS,
wherein the signed ULI includes a timestamp indicative that a user equipment was at a location of the AP at a given time: and
sending the signed ULI to one of a 3GPP mobility controller or an emergency service via a 3GPP network interface.

14. The method according to claim 13 wherein the SeND-NS comprises the CGA, a nonce, a ULI request, and the public key of the public-private key pair.

15. The method according to claim 13 wherein the ULI is signed with the cryptographic-public key.

16. The method according to claim 13 wherein the signed ULI is received from the AP via a link layer protocol.

17. The method according to claim 13 wherein the signed ULI is received from the AP via an IPv6 SeND-network advertisement (NA).

18. The method according to claim 13 wherein the signed ULI comprises at least one of: the CGA, a timestamp, geo-location information, a service set identifier (SSID) of the access network; a signed object with the private key in the ULI; and a public key of the access network.

19. The method according to claim 13 wherein the 3GPP network interface sends the signed ULI to the 3GPP mobility controller over a first interface to a packet data gateway, and over a second interface to a PGW (packet data network gateway) from the packet data gateway.

20. The method according to claim 13 wherein the 3GPP network interface sends the signed ULI to the 3GPP mobility controller over an application layer protocol.

* * * * *